(12) United States Patent
Taniguchi (10) Patent No.: US 11,429,744 B2
(45) Date of Patent: Aug. 30, 2022

(54) INFORMATION MANAGEMENT DEVICE AND INFORMATION MANAGEMENT METHOD

(71) Applicant: FUJITSU LIMITED, Kawasaki (JP)

(72) Inventor: Kazuhiro Taniguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 500 days.

(21) Appl. No.: 16/671,885

(22) Filed: Nov. 1, 2019

(65) Prior Publication Data

US 2020/0151357 A1     May 14, 2020

(30) Foreign Application Priority Data

Nov. 9, 2018   (JP) .............................. JP2018-211642

(51) Int. Cl.
*G06F 21/62*     (2013.01)
*G06F 16/901*     (2019.01)
*G06Q 50/26*     (2012.01)

(52) U.S. Cl.
CPC ........ *G06F 21/6245* (2013.01); *G06F 16/901* (2019.01); *G06Q 50/265* (2013.01)

(58) Field of Classification Search
CPC .. G06F 21/6245; G06F 16/901; G06Q 50/265
See application file for complete search history.

(56) References Cited

U.S. PATENT DOCUMENTS

| 5,748,905 A * | 5/1998 | Hauser ..................... H04L 9/40 709/249 |
| 2003/0014394 A1 | 1/2003 | Fujiwara et al. |
| 2003/0023560 A1* | 1/2003 | Soma ..................... G06F 30/30 705/51 |
| 2005/0144460 A1 | 6/2005 | Yuriyama et al. |
| 2006/0287766 A1* | 12/2006 | Kraft ..................... H04L 63/08 700/236 |

(Continued)

FOREIGN PATENT DOCUMENTS

| JP | 2002-312220 A | 10/2002 |
| JP | 2005-182707 A | 7/2005 |

(Continued)

OTHER PUBLICATIONS

NPL Search Terms (Year: 2022).*

(Continued)

*Primary Examiner* — Syed A Zaidi
(74) *Attorney, Agent, or Firm* — Fujitsu Patent Center (57) ABSTRACT

An information management device includes a memory and a processor configured to receive an access request to information related to individual, the access request including designation of a first data table including first information related to the individual and a second data table including second information related to the individual, perform, in accordance with whether the first data table and the second data table include a same key, determination of whether the individual is identified based on a combination of the first information and the second information to be included in a response to the access request, and perform a stop of output of the response when it is determined that the individual is identified based on the combination.

17 Claims, 11 Drawing Sheets

(56) References Cited

U.S. PATENT DOCUMENTS

| | | | | |
|---|---|---|---|---|
| 2008/0154625 A1* | 6/2008 | Serbanescu | ........ | G06Q 30/0603 705/26.1 |
| 2010/0235390 A1* | 9/2010 | Sano | ................ | G06F 16/2264 707/E17.014 |
| 2014/0236960 A1* | 8/2014 | Russakovsky | ........ | G06F 16/245 707/769 |
| 2014/0297615 A1* | 10/2014 | Dynin | ................ | G06F 16/9535 707/706 |
| 2020/0137109 A1* | 4/2020 | Endler | ................ | H04L 63/1425 |
| 2020/0142941 A1* | 5/2020 | Box | ................ | G06F 16/907 |

FOREIGN PATENT DOCUMENTS

| | | |
|---|---|---|
| JP | 2008-134936 | 6/2008 |
| JP | 2011-257863 | 12/2011 |
| JP | 2013-134731 | 7/2013 |
| JP | 2015-176310 | 10/2015 |

OTHER PUBLICATIONS

Yan, Weipeng P., and P-A. Larson. "Performing group-by before join/spl lsqb/query processing/spl rsqb." Proceedings of 1994 IEEE 10th International Conference on Data Engineering. IEEE, 1994. (Year: 1994).*

Japanese Office Action dated Jun. 7, 2022 for corresponding Japanese Patent Application No. 2018-211642, with English Translation, 7 pages.

* cited by examiner

| TABLE NAME | ATTRIBUTE | SEMI-PERSONAL INFORMATION TABLE NAME | JOIN KEY |
|---|---|---|---|
| account | SEMI-PERSONAL INFORMATION TABLE | – | acc_id |
| post_message | RELATED TABLE | account | acc_id |
| history | NON-TARGET TABLE | – | – |

FIG. 2B

| SEMI-PERSONAL INFORMATION TABLE NAME | TYPE | POLICY |
|---|---|---|
| default | ACCESS TIME | 00:00:00 – 05:59:59 |
| account | ACCESS TIME | 00:00:00 – 06:29:59 |
| | TASK APPLICATION NAME | apl01 |
| | CLIENT MACHINE | 192.33.44.* |

FIG. 3

```
CREATE TABLE post_message (
    post_id    INTEGER       NOT NULL,
    acc_id     INTEGER       NOT NULL,
    ;
    message    VARCHAR(256)  NOT NULL,
    CONSTRAINT cs1 FOREIGN KEY(acc_id) REFERENCES account (acc_id)
);
```

KEY JOINING

```
CREATE TABLE account (
    acc_id   INTEGER       NOT NULL,
    name     VARCHAR(64)   NOT NULL,
    ;
    PRIMARY KEY(acc_id)
);
```

FIG. 4A

SELECT acc_id FROM account WHERE name LIKE '%hoge%';

SELECT acc_id FROM post_message WHERE message LIKE '%hoge%';

FIG. 4B

SELECT message FROM post_message WHERE acc_id = ?;

SELECT name, address FROM account WHERE acc_id = ?;

FIG. 4C

SELECT B.message FROM account as A, post_message as B WHERE A.acc_id = B.acc_id AND A.name LIKE '%hoge%';

FIG. 5A 2018-08-15 14:17:08.674 JST [61137] ALERT: detect an predictive access xxx foreign key = ???

FIG. 5B 2018-08-15 14:17:08.674 JST [61137] ALERT: detect an unauthorized access xxx

INFORMATION MANAGEMENT DEVICE AND INFORMATION MANAGEMENT METHOD

CROSS-REFERENCE TO RELATED APPLICATION

This application is based upon and claims the benefit of priority of the prior Japanese Patent Application No. 2018-211642, filed on Nov. 9, 2018, the entire contents of which are incorporated herein by reference.

FIELD

The embodiment discussed herein is related to an information management technology.

BACKGROUND

Measures to safely manage personal information have actively been taken. For example, leakage of personal information greatly influences a company's existence, and hence it has been important to make sure that management departments in charge of personal information comply with regulatory compliance, and besides, to take security measures for personal information database systems.

In the personal information database systems, security measures for semi-personal information is important as well as security measures for personal information. The "semi-personal information" used herein is an information element of personal information, and is information that may form the personal information in combination with related information.

Figure 11:
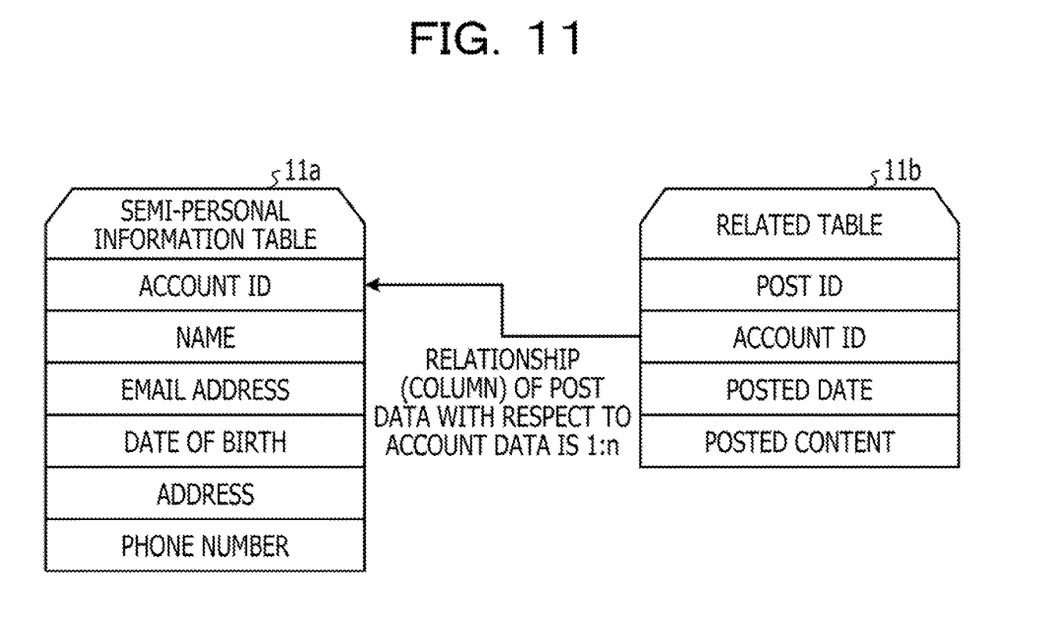
FIG. 11 is a diagram illustrating semi-personal information.

FIG. 11 is a diagram illustrating semi-personal information. In FIG. 11, a semi-personal information table 11a is a table for managing semi-personal information such as the name and date of birth of a user who uses a social networking service (SNS). In the semi-personal information table 11a, part of personal information is included. In the semi-personal information table 11a, as account data, an account identification (ID), a name, an email address, a date of birth, an address, and a phone number are included.

The account ID is an identifier for identifying a user's account on the SNS. The name represents a user's name. The email address represents a user's email address. The date of birth represents a date on which a user was born. The address represents a user's address. The phone number represents a user's phone number.

A related table 11b is a table in which pieces of information associated with the account, such as posted contents, are accumulated in real time. In the related table 11b, detailed activities of the person and other matters are recorded. The pieces of information that are accumulated in the related table 11b are confidential and are not personally identifiable. In the related table 11b, as post data, a post ID, an account ID, a posted date, and a posted content are included.

The post ID is an identifier for identifying a post. The account ID is an identifier for identifying the account of a user who has written a post. The posted date represents a date on which a post has been written. The posted content represents the contents of a post.

The semi-personal information table 11a and the related table 11b may be coupled to each other with the use of the account ID. A relationship of the post data with respect to the account data is 1:n (n is a positive integer). A combination of the account data and the post data, which is obtained with the use of the account ID, reveals personal activities and preferences, and hence information based on the combination of the account data and the post data is personal information.

There has been a technology that displays, when access to customer information is requested from a mobile device, the customer information on the mobile device in a case where the access request is matched with a date, a mobile device identification information, and a customer name that are registered in a display condition table, to thereby reduce a risk that important information leaks from the mobile device as much as possible.

There has been a database management system configured to determine, by referring to the confidential identification attribute of a column in which data requested to be acquired is stored, whether or not the data is confidential information, and forbid projection of the column when the data is confidential information, to thereby protect the confidential information.

There has been a technology that cuts out the need for creation of an access control rule for each data to be operated or each owner thereof, to thereby reduce a burden on a manager of a data accumulation system. In this technology, the data accumulation system has a first search criterion that when the data accumulation system receives a data operation request, information on a person who has made the access, operation type information, and data set identification information that have been specified by this data operation request are all matched. The data accumulation system has a second search criterion that, of a plurality of items included in operation target patient data specified by the data operation request, at least one combination that is used as an access control data key is matched. The data accumulation system searches for an access control rule satisfying the first and second search criteria from an access control list storage unit, and determines whether to deny the access based on this access control rule.

There has been a technology that reduces a risk that information that identifies an individual and a referred person thus does not want to open to the public is grasped by a referring person by referring to a combination of a plurality of pieces of personal information or life blog information on the referred person. In this technology, a disclosure request acquisition unit acquires a disclosure request indicating public information requested to be disclosed by the referring person. Then, an information disclosure control unit determines whether or not a combination of public information included in reference information stored in a reference information storage unit and the public information indicated by the disclosure request is included in not-to-be-transmitted information stored in a not-to-be-transmitted information storage unit. When determining that the combination is included in the not-to-be-transmitted information, the information disclosure control unit forbids transmission of the public information indicated by the disclosure request to the referring person. When determining that the combination is not included in the not-to-be-transmitted information, the information disclosure control unit reads, from a public information storage unit, the public information indicated by the disclosure request, and makes an information disclose unit transmit the public information to the referring person's device.

The related technologies are disclosed in, for example, Japanese Laid-open Patent Publication No. 2015-176310, Japanese Laid-open Patent. Publication No. 2008-134936, Japanese Laid-open Patent Publication No. 2013-134731, and Japanese Laid-open Patent Publication No. 2011-257863.

SUMMARY

According to an aspect of the embodiment, an information management device includes a memory and a processor configured to receive an access request to information related to individual, the access request including designation of a first data table including first information related to the individual and a second data table including second information related to the individual, perform, in accordance with whether the first data table and the second data table include a same key, determination of whether the individual is identified based on a combination of the first information and the second information to be included in a response to the access request, and perform a stop of output of the response when it is determined that the individual is identified based on the combination.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

In the determination of whether or not information is personal information based on a combination of data stored in a plurality of tables, a combination of tables with information that may not to be disclosed is manually set in advance, which leads to complicated processing. For example, information that is personal information based on a combination of data stored in a plurality of tables sometimes leaks.

Now, an information management program, an information management method, and an information management device according to an embodiment that the present application discloses are described in detail with reference to the drawings. The embodiment does not limit the technologies disclosed herein.

Figure 1:
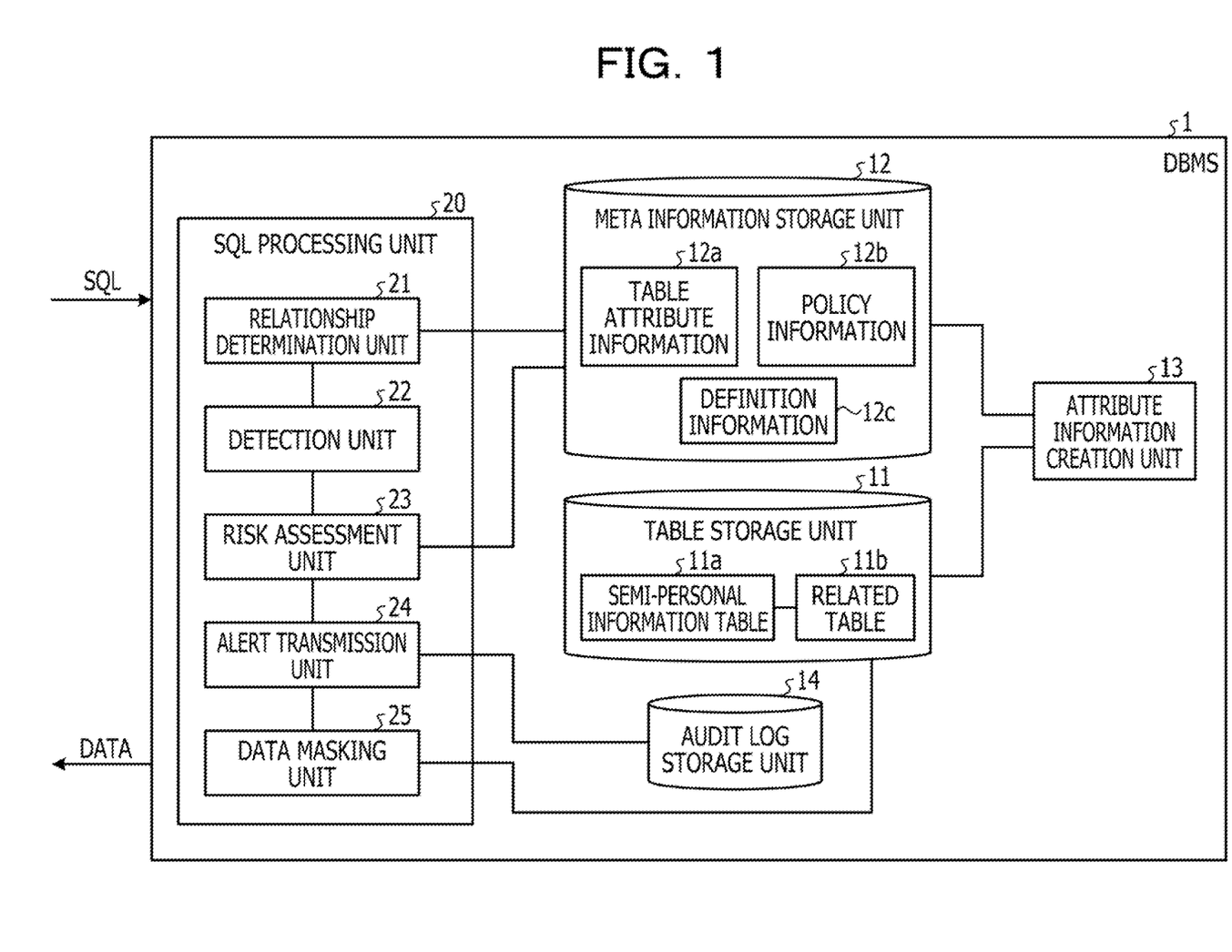
FIG. 1 is a diagram illustrating a functional configuration of a DBMS according to an embodiment.

The functional configuration of a database management system (DBMS) according to the embodiment is first described. FIG. 1 is a diagram illustrating a functional configuration of a DBMS according to the embodiment. As illustrated in FIG. 1, a DBMS 1 according to the embodiment includes a table storage unit 11, a meta information storage unit 12, an attribute information creation unit 13, an audit log storage unit 14, and an SQL processing unit 20.

The table storage unit 11 stores the semi-personal information table 11a and the related table 11b exemplified in FIG. 11. Based on a combination of the semi-personal information table 11a and the related table 11b, personal information is specified. A plurality of related tables 11b may be provided. The table storage unit 11 also stores a table other than the semi-personal information table 11a and the related table 11b.

The meta information storage unit 12 stores, as meta information, information on the information that the table storage unit 11 stores. The meta information storage unit 12 stores table attribute information 12a, policy information 12b, and definition information 12c. The table attribute information 12a is information on the attribute of a table. The policy information 12b is information on a policy for a normal task of accessing to the semi-personal information table 11a and the related table 11b. The definition information 12c is information for defining a table.

Figure 2A:
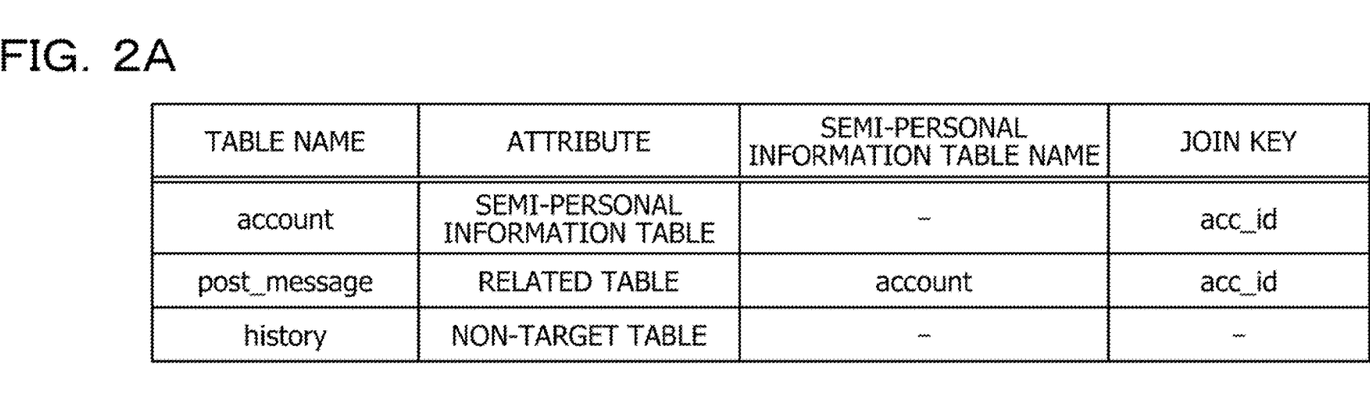
FIGS. 2A and 2B depict diagrams illustrating examples of table attribute information and policy information.
Figure 2B:
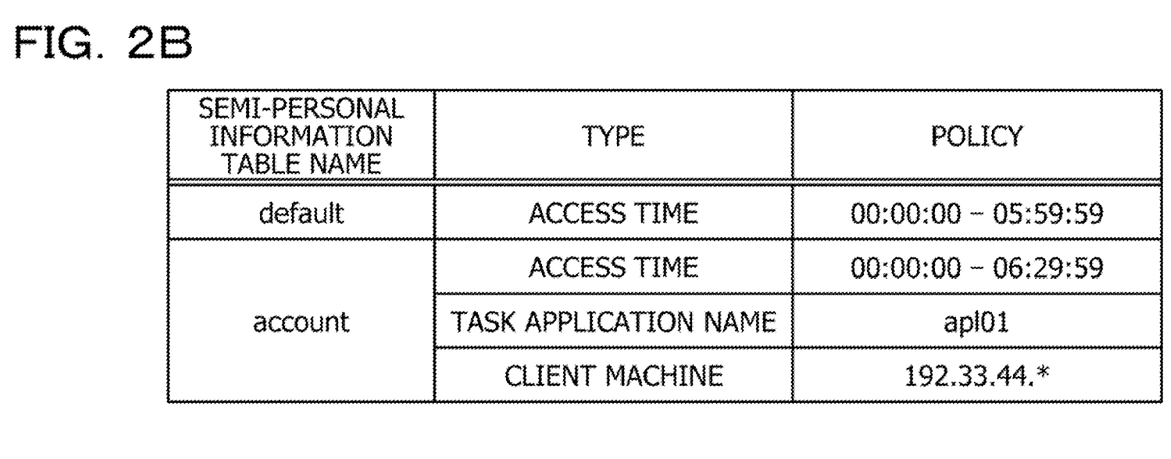

FIGS. 2A and 2B depict diagrams illustrating examples of table attribute information and policy information. The table attribute information and the policy information illustrated in FIGS. 2A and 2B may be the table attribute information 12a and the policy information 12b illustrated in FIG. 1. As illustrated in FIG. 2A, the table attribute information 12a includes a table name, an attribute, a semi-personal information table name, and a join key.

The table name represents a name for identifying a table. The attribute indicates whether a table is the semi-personal information table 11a, the related table 11b, or another non-target table. The semi-personal information table name represents the name of the semi-personal information table 11a to be joined in a case where a table is the related table 11b. The join key represents a key that is used for joining the semi-personal information table 11a and the related table 11b to each other.

For example, a table identified by "account" is the semi-personal information table 11a, and a key that is used for joining the semi-personal information table 11a to the related table 11b is "acc_id." A table identified by "post_message" is the related table 11b. The semi-personal information table 11a to which the related table 11b is joined is "account," and a key that is used for joining the related table 11b to the semi-personal information table 11a is "acc_id."

As illustrated in FIG. 2B, the policy information 12b includes a semi-personal information table name, a type, and a policy.

The semi-personal information table name represents a name for identifying the semi-personal information table 11a to which a policy is applied. The type represents a type of the policy. The type includes "access time" that represents time in which a normal task accesses the semi-personal information table 11a, "task application name" that represents the name of a normal task, and "client machine" that indicates a device configured to make access.

The policy is information on normal access and differs depending on the types. In a case where the type is "access time," the policy is a period of time in which normal access is made. In a case where the type is "task application name,"

the policy is the name of an application that makes normal access. In a case where the type is "client machine," the policy is the Internet protocol (IP) address of a client device that makes normal access.

For example, the semi-personal information table 11a identified by "account" is accessed by "apl01" configured to operate on a device having an IP address "192.33.44.*" in a period of "00:00:00" to "06:29:59."

An entry having a semi-personal information table name "default" indicates a default value. In FIG. 28, the default value has "access time" of "00:00:00" to "05:59:59." In such a way, it is enough that the policy information 12b includes at least one of "access time," "task application name," and "client machine."

The attribute information creation unit 13 analyzes the tables stored in the table storage unit 11 to create the table attribute information 12a, and stores the table attribute information 12a in the meta information storage unit 12 as meta information. The attribute information creation unit 13 classifies the columns of the data stored in the tables by performing natural language analysis on noun phrases such as the name and the date of birth, and specifies, as the semi-personal information table 11a, a table having a column with the name and the date of birth, for example.

The attribute information creation unit 13 specifies the semi-personal information table 11a as an extension of an update of statistical information that the DBMS 1 makes regularly and asynchronously, for example. Alternatively, the attribute information creation unit 13 may specify the semi-personal information table 11a when data is stored with an SQL statement. Still alternatively, the attribute information creation unit 13 may specify the semi-personal information table 11a by receiving a table name input by a system manager with a keyboard or a touch panel.

The attribute information creation unit 13 specifies the related table 11b by using a column to which a unique constraint of the semi-personal information table 11a has been set. This is because, in the case of a table for managing an account such as the semi-personal information table 11a, a unique constraint is set to an identifier for uniquely indicating the account.

The related table 11b is associated with the semi-personal information table 11a with a join key being the identifier to which the unique constraint is set in the semi-personal information table 11a. In the related table 11b, a referential constraint, which is a foreign key constraint, is set to indicate that the related table 11b is associated with the semi-personal information table 11a. The attribute information creation unit 13 specifies the related table 11b by using the referential constraint referring to the identifier to which the unique constraint is set in the semi-personal information table 11a.

Figure 3:
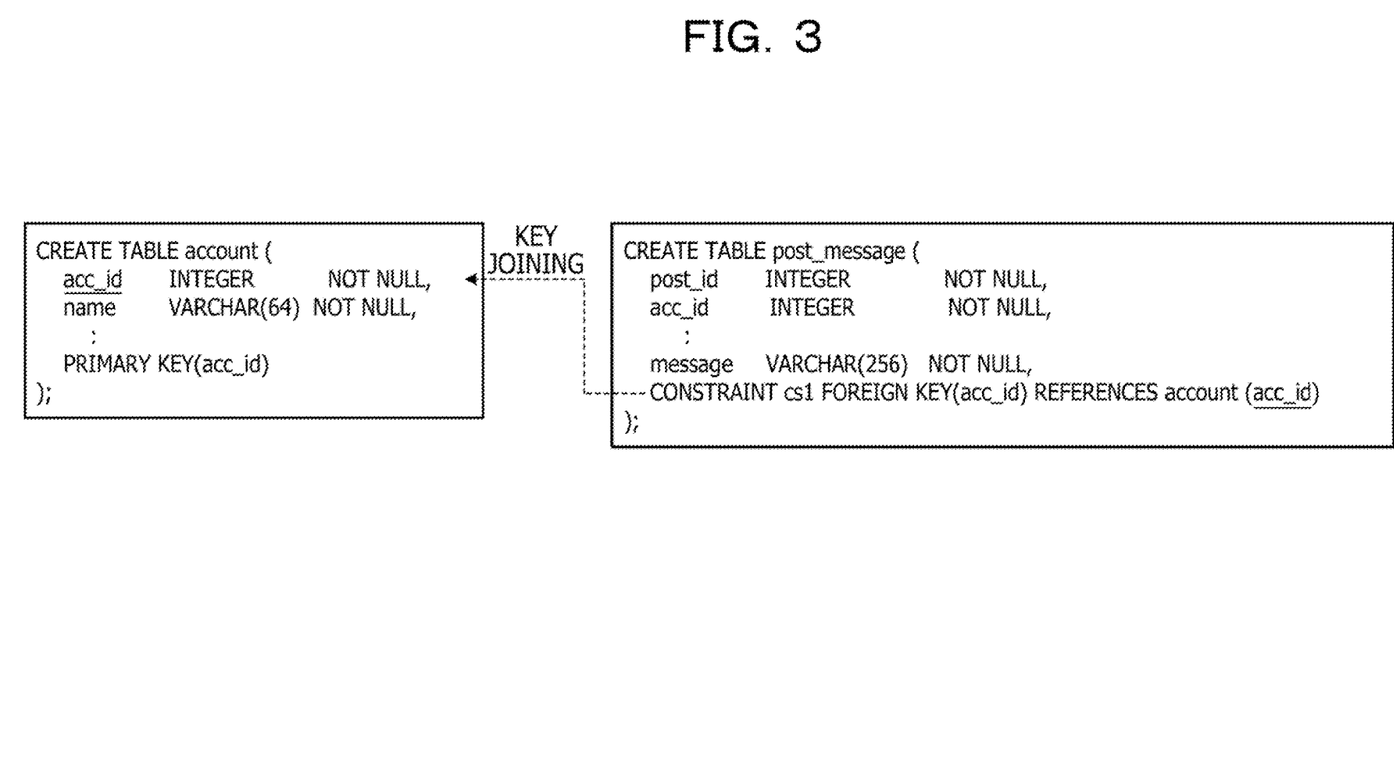
FIG. 3 is a diagram illustrating an example of a referential constraint.

FIG. 3 is a diagram illustrating an example of a referential constraint. In FIG. 3, in a table (TABLE) identified by "post_message," "CONSTRAINT cs1 FOREIGN KEY (acc_id) REFERENCES account (acc_id)" is the referential constraint.

In the semi-personal information table 11a identified by "account," the unique constraint is set to "acc_id" by "PRIMARY KEY (acc_id)." In the referential constraint, "acc_id" of the semi-personal information table 11a identified by "account" is referred to as a foreign key, and "acc_id" functions as a join key. Here, "cs1" is an identifier for identifying the referential constraint. The referential constraint is included in the definition information 12c.

Referring back to FIG. 1, the audit log storage unit 14 stores an alert that is output when illegal access or predictive access is made to a table. The "predictive access" used herein is access that is the sign of access to personal information.

The SQL processing unit 20 processes an SQL query. The SQL processing unit 20 includes a relationship determination unit 21, a detection unit 22, a risk assessment unit 23, an alert transmission unit 24, and a data masking unit 25.

The relationship determination unit 21 refers to the table attribute information 12a to determine whether or not an SQL query is access to at least one of the semi-personal information table 11a and the related table 11b.

The detection unit 22 detects predictive access or personal information access from an SQL query determined by the relationship determination unit 21 as access to at least one of the semi-personal information table 11a and the related table 11b.

The detection unit 22 detects an SQL query as predictive access in a case where the join key is specified to a selection column of the SQL statement. The detection unit 22 detects an SQL query as personal information access in a case where the join key is specified to a condition column of the SQL statement. The detection unit 22 detects an SQL query as personal information access in a case where the semi-personal information table 11a and the related table 11b are joined to each other by the SQL statement.

Figure 4A:
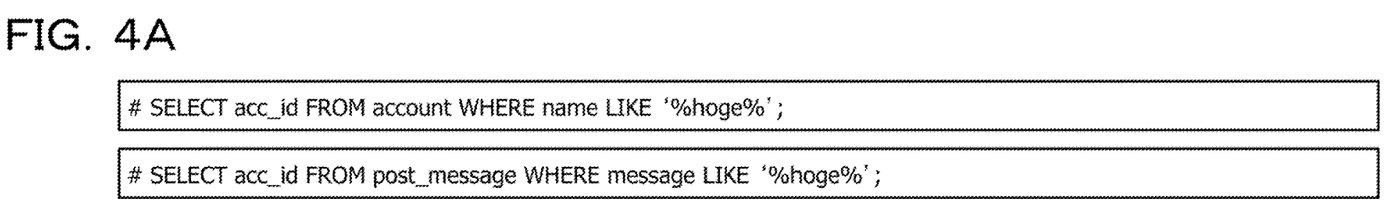
FIGS. 4A to 4C depict diagrams illustrating examples of predictive access and personal information access.
Figure 4B:
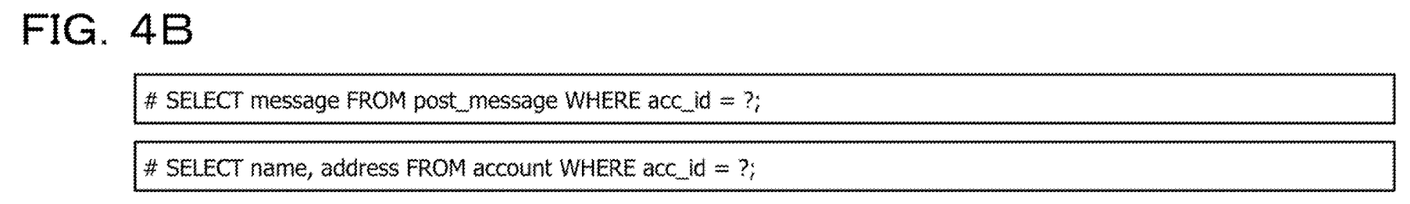
Figure 4C:
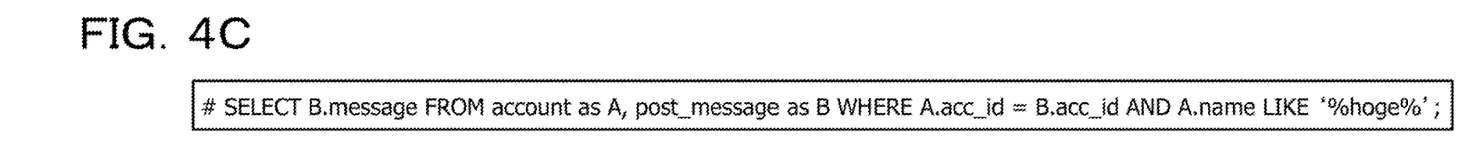

FIGS. 4A to 4C depict diagrams illustrating examples of predictive access and personal information access. FIG. 4A illustrates an example of predictive access with the join key being specified to a selection column of an SQL statement. FIG. 4B illustrates an example of personal information access with the join key being specified to a condition column of an SQL statement. FIG. 4C illustrates an example of personal information access in which the semi-personal information table 11a and the related table 11b are joined to each other by an SQL statement.

FIG. 4A illustrates that the join key is searched for in advance to search the semi-personal information table 11a or the related table 11b. In the first example of FIG. 4A, the join key "acc_id" is searched for from the semi-personal information table 11a "account," and in the second example of FIG. 4A, the join key "acc_id" is search for from the related table 11b "post_message."

In FIG. 4B, personal information is searched for from the join key. In the first SQL statement of FIG. 4B, "message (posted content)" is searched for from the related table 11b "post_message." In the second SQL statement, "name (name)" and "address (address)" are search for from the semi-personal information table 11a "account." Based on a combination of the search results of the two SQL statements, the personal information is obtained.

In FIG. 4C, personal information is searched for only with one SQL statement. In the example of FIG. 4C, "message (posted content)" that has "post_message" and "account" both with "acc_id" and has "name (name)" of "account" with "hope" is searched for.

The risk assessment unit 23 assess risks of predictive access and personal information access detected by the detection unit 22. In a case where the detection unit 22 detects predictive access, the risk assessment unit 23 determines the need for monitoring. In a case where the detection unit 22 detects personal information access, the risk assessment unit 23 determines, based on the policy information 12b, whether the personal information access is normal access complying with the normal task policy or illegal access not complying with the normal task policy.

Figure 5A:
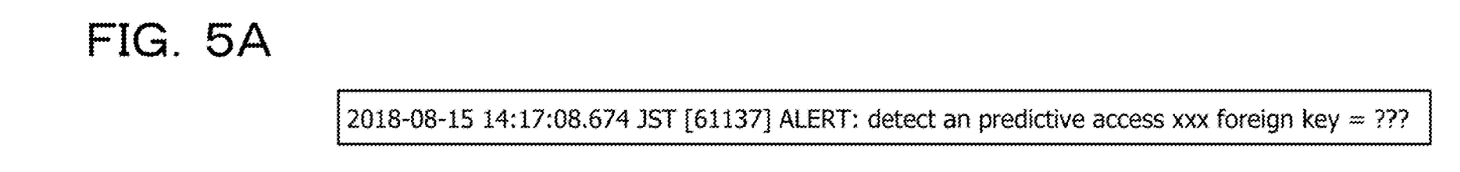
FIGS. 5 and 5B depict diagrams illustrating examples of an alarm.
Figure 5B:
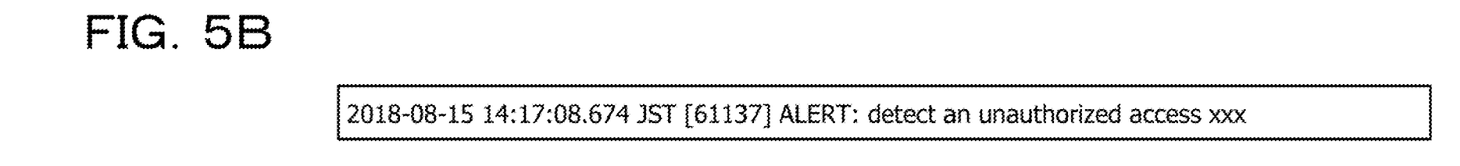

In a case where the risk assessment unit 23 determines the need for monitoring or determines that the personal information access is illegal access, the alert transmission unit 24 outputs an alarm to the audit log storage unit 14. FIGS. 5A and 5B depict diagrams illustrating examples of an alarm. FIG. 5A illustrates an alert that is output in a case where predictive access is made, and FIG. 5B illustrates an alert that is output in a case where illegal access is made.

As illustrated in FIG. 5A, with a join key (foreign key) output by the alert transmission unit 24, the system manager may monitor queries that actually access personal information from only searches with the join keys specified to the condition columns. As illustrated in FIG. 5B, with an alert output by the alert transmission unit 24, the system manager may recognize that illegal access has been made.

In a case where the risk assessment unit 23 determines that the personal information access is illegal access, the alert transmission unit 24 forcibly terminates the connection of illegal access.

In a case where the risk assessment unit 23 determines that the personal information access is normal access, the data masking unit 25 masks the query result and outputs the resultant to the semi-personal information table 11a and the related table 11b. In a case where no masking is needed depending on tasks, the data masking unit 25 outputs the query result without masking.

Figure 6:
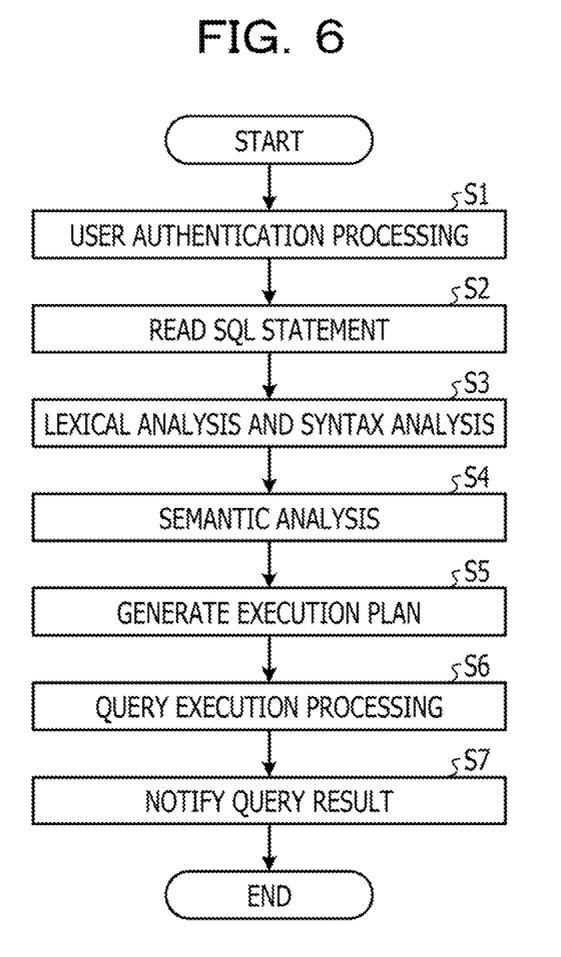
FIG. 6 is a flow chart illustrating a flow of structured query language (SQL) query processing.

The flow of SQL query processing is described next. FIG. 6 is a flow chart illustrating a flow of SQL query processing. As illustrated in FIG. 6, the SQL processing unit 20 performs user authentication processing of authenticating a user (Step S1), and reads an SQL statement input by the user when the user authentication succeeds (Step S2).

The SQL processing unit 20 performs lexical analysis and syntax analysis of the SQL statement (Step S3), to thereby perform semantic analysis (Step S4). The SQL processing unit 20 refers to, when performing semantic analysis, the table attribute information 12a to determine whether or not the SQL query is access to at least one of the semi-personal information table 11a and the related table 11b. When determining that the SQL query is access to at least one of the semi-personal information table 11a and the related table 11b, the SQL processing unit 20 performs processing of detecting predictive access or personal information access.

The SQL processing unit 20 generates an execution plan for executing the SQL query (Step S5). When executing the query, the SQL processing unit 20 assess an access risk, and performs suitable processing, such as output of an alert, based on the assessment result.

In a case where the SQL query is not illegal access, the SQL processing unit 20 performs query execution processing of executing the query (Step S6), and notifies the query result (Step S7). When notifying the query result of normal access, the SQL processing unit 20 masks the data.

In such a way, the SQL processing unit 20 detects predictive access or personal information access when performing semantic analysis, to thereby enable a reduction in risk of personal information leakage.

Figure 7:
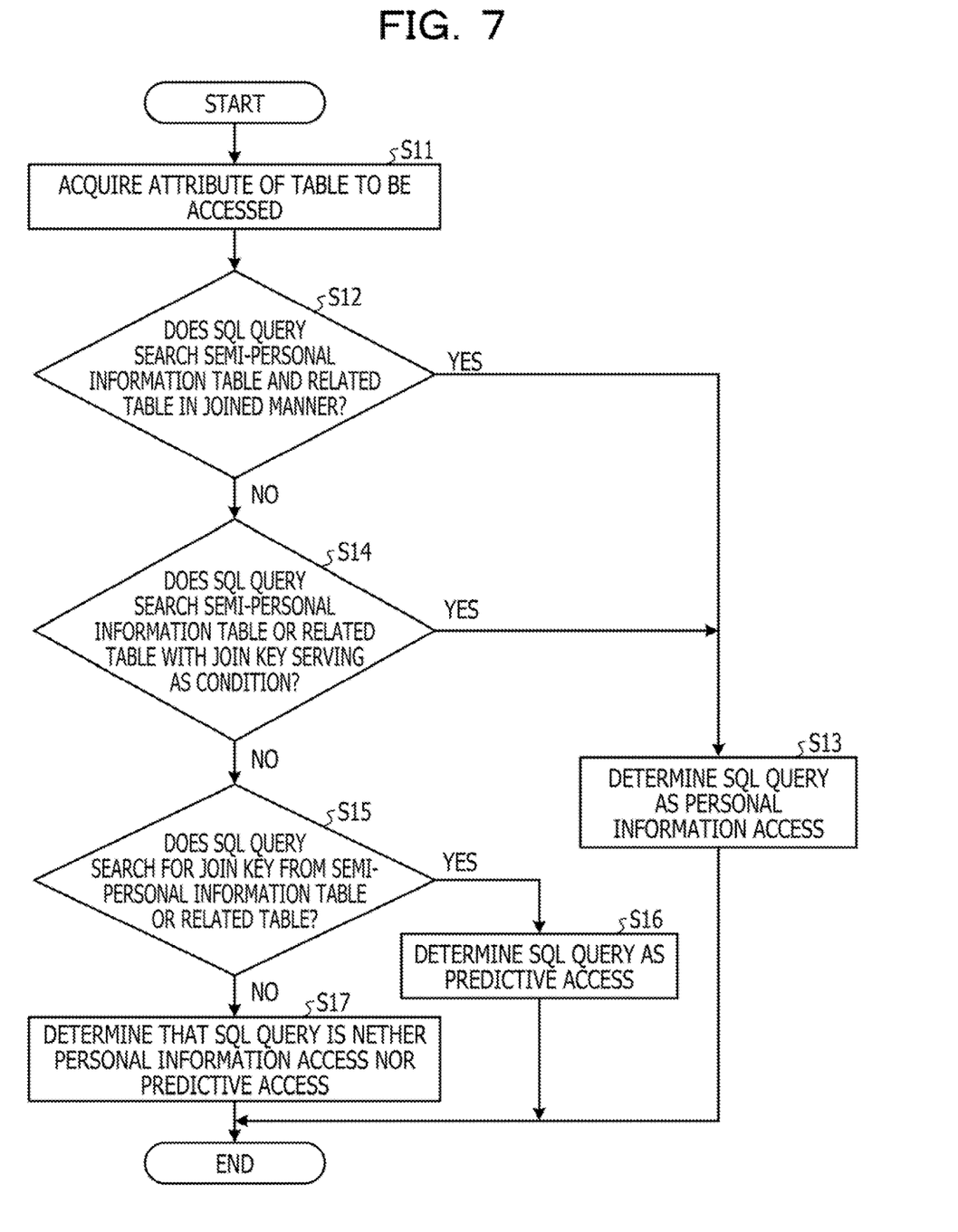
FIG. 7 is a flow chart illustrating a flow of detection processing.

The flow of detection processing is described next. The "detection processing" used herein is processing of detecting whether an SQL query is predictive access or personal information access to at least one of the semi-personal information table 11a and the related table 11b. FIG. 7 is a flow chart illustrating a flow of detection processing.

As illustrated in FIG. 7, the SQL processing unit 20 acquires the attribute of a table to be accessed from the meta information storage unit 12 (Step S11), and determines whether or not an SQL query searches the semi-personal information table 11a and the related table 11b in a joined manner (Step S12). In a case where the SQL query searches the semi-personal information table 11a and the related table 11b in a joined manner, the SQL processing unit 20 determines the SQL query as personal information access (Step S13).

In a case where the SQL query does not search the semi-personal information table 11a and the related table 11b in a joined manner, on the other hand, the SQL processing unit 20 determines whether or not the SQL query searches the semi-personal information table 11a or the related table 11b with the join key serving as a condition (Step S14). In a case where the SQL query searches the semi-personal information table 11a or the related table 11b with the join key serving as a condition, the SQL processing unit 20 determines the SQL query as personal information access (Step S13).

In a case where the SQL query does not search the semi-personal information table 11a or the related table 11b with the join key serving as a condition, the SQL processing unit 20 determines whether the SQL query searches for a join key from the semi-personal information table 11a or the related table 11b (Step S15). In a case where the SQL query searches for a join key from the semi-personal information table 11a or the related table 11b, the SQL processing unit 20 determines the SQL query as predictive access (Step S16).

In a case where the SQL query does not search for a join key from the semi-personal information table 11a or the related table 11b, on the other hand, the SQL processing unit 20 determines that the SQL query is nether personal information access nor predictive access (Step S17).

In such a way, the SQL processing unit 20 detects predictive access and personal information access based on the attribute of a table to be accessed and a content that is searched for in the table to be accessed, to thereby enable a reduction in risk of personal information leakage. The determinations in Step S12, Step S14, and Step S15 are not necessarily made in this order. For example, the determinations may be made in order of Step S15, Step S14, and Step S12.

Figure 8:
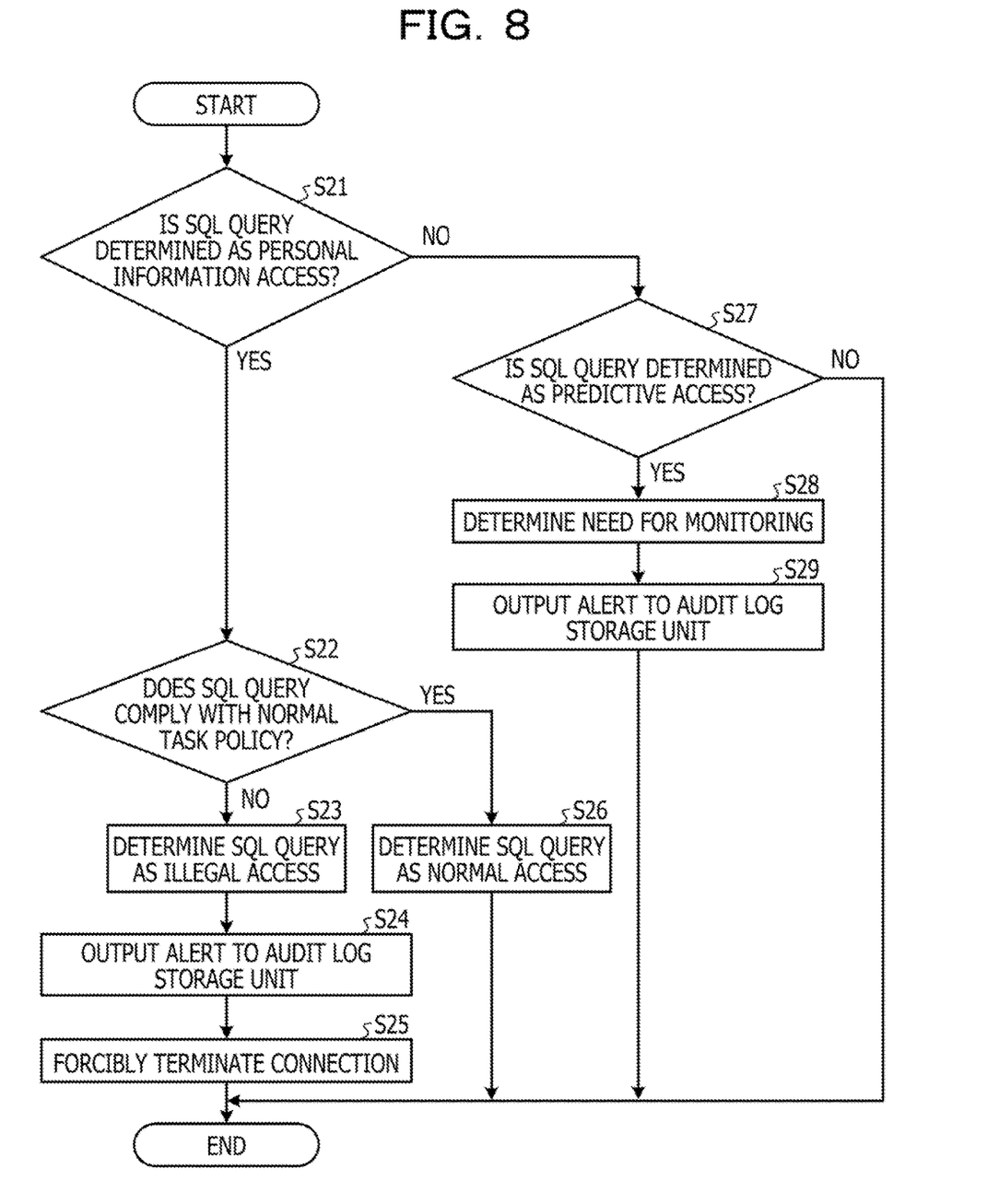
FIG. 8 is a flow chart illustrating a flow of risk assessment and alert transmission processing.

The flow of risk assessment and alert transmission processing is described next. FIG. 8 is a flow chart illustrating a flow of risk assessment and alert transmission processing.

As illustrated in FIG. 8, the SQL processing unit 20 determines whether or not an SQL query is determined as personal information access (Step S21). In a case where the SQL query is determined as personal information access, the SQL processing unit 20 determines whether the SQL query complies with the normal task policy (Step S22). In a case where the SQL query does not comply with the normal task policy, the SQL processing unit 20 determines the SQL query as illegal access (Step S23). The SQL processing unit 20 outputs an alert to the audit log storage unit 14 (Step S24), and forcibly terminates the connection (Step S25).

In a case where the SQL query complies with the normal task policy, on the other hand, the SQL processing unit 20 determines the SQL query as normal access (Step S26). In a case where the SQL query is not determined as personal information access, the SQL processing unit 20 determines whether or not the SQL query is determined as predictive access (Step S27). In a case where the SQL query is determined as predictive access, the SQL processing unit 20 determines the need for monitoring (Step S28), and outputs an alert to the audit log storage unit 14 (Step S29).

In such a way, the SQL processing unit 20 forcibly terminates the connection of illegal access, to thereby enable a reduction in risk of personal information leakage.

Figure 9:
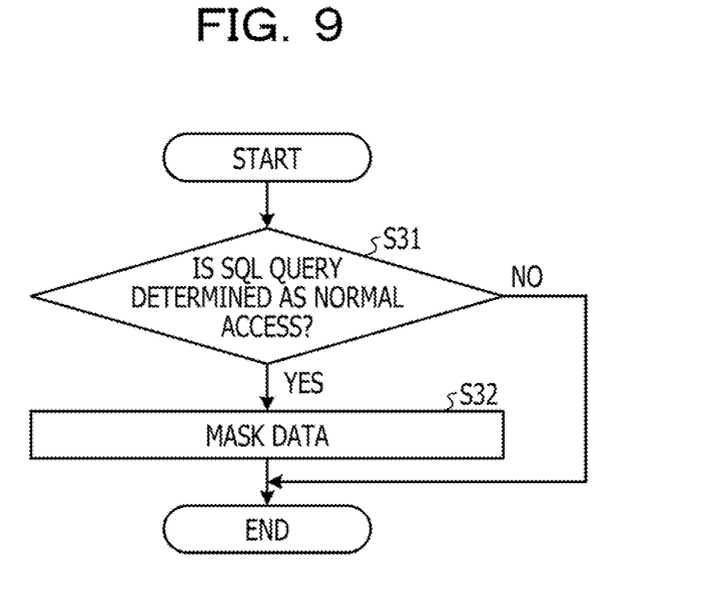
FIG. 9 is a flow chart illustrating a flow of data masking processing.

The flow of data masking processing is described next. FIG. 9 is a flow chart illustrating a flow of data masking processing. As illustrated in FIG. 9, the SQL processing unit 20 determines whether or not an SQL query is determined as normal access (Step S31). In a case where the SQL query is determined as normal access, the SQL processing unit 20 masks data (Step S32).

In such a way, the SQL processing unit 20 masks data in a case where information specifying personal information is provided, to thereby enable a reduction in risk of personal information leakage.

As described above, in the embodiment, the attribute information creation unit 13 specifies the semi-personal information table and the related table 11b that is joined thereto with a join key, and registers the items to the table attribute information 12a. The relationship determination unit 21 refers to the table attribute information 12a to determine whether or not an SQL query is access to at least one of the semi-personal information table 11a and the related table 11b. When the relationship determination unit 21 determines that the SQL query is access to at least one of the semi-personal information table 11a and the related table 11b, the detection unit 22 determines whether or not the SQL query is predictive access or personal information access. The risk assessment unit 23 determines, based on the policy information 12b, whether the personal information access is normal access or illegal access. The alert transmission unit 24 outputs an alert when the personal information access is predictive access. The alert transmission unit 24 outputs an alert and forcibly terminates the connection when the personal information access is illegal access. The DBMS 1 may consequently reduce the risk of leakage of personal information that is specified based on a combination of the semi-personal information table 11a and the related table 11b.

In the embodiment, in the case where an SQL query searches for the information in the semi-personal information table 11a and the information in the related table 11b in a combined manner with a join key, the detection unit 22 determines the SQL query as personal information access. Alternatively, in the case where an SQL query searches for information from the semi-personal information table 11a or the related table 11b by using a join key, the detection unit 22 determines the SQL query as personal information access. In the case where an SQL query searches for a join key from the semi-personal information table 11a or the related table 11b, the detection unit 22 determines the SQL query as predictive access. The DBMS 1 may therefore detect personal information access and predictive access.

In the embodiment, the risk assessment unit 23 determines, based on the policy information 12b, whether or not personal information access is normal access, and hence the DBMS 1 may allow access complying with the policy.

In the embodiment, the policy information 12b includes information on access time, a task application name, and a client machine, and hence the risk assessment unit 23 may specify normal access complying with the policy.

In the embodiment, the attribute information creation unit 13 specifies, from a plurality of tables, a table including the name and the date of birth as the semi-personal information table 11a. The attribute information creation unit 13 may therefore accurately specify the semi-personal information table 11a.

In the embodiment, the attribute information creation unit 13 retrieves, from the definition information 12c, the information on the referential constraint set to the related table 11b, to thereby specify a relation between the semi-personal information table 11a and the related table 11b. The attribute information creation unit 13 may therefore accurately specify the related table 11b.

In the embodiment, the DBMS 1 is described, and the functions of the DBMS 1 are achieved by a computer executing a database management program. The computer configured to execute the database management program is now described.

Figure 10:
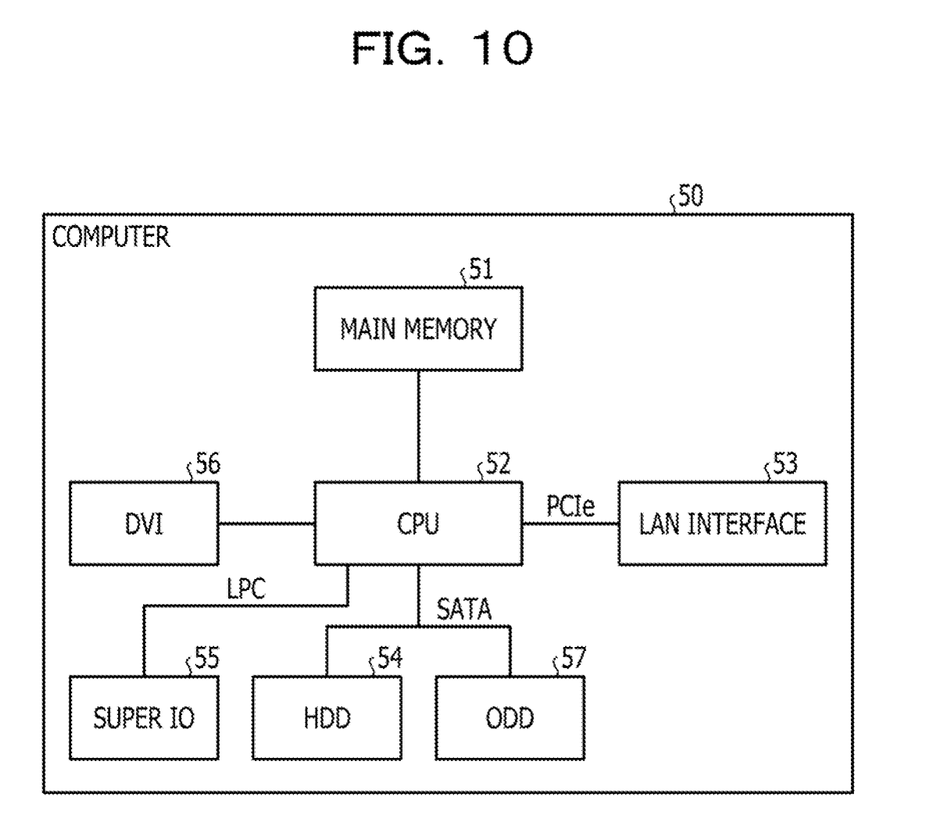
FIG. 10 is a diagram illustrating a hardware configuration of a computer configured to execute a database management program according to the embodiment.

FIG. 10 is a diagram illustrating a hardware configuration of a computer configured to execute a database management program according to the embodiment. As illustrated in FIG. 10, a computer 50 includes a main memory 51, a central processing unit (CPU) 52, a local area network (LAN) interface 53, and a hard disk drive (HDD) 54. The computer 50 also includes a super input/output (IO) 55, a digital visual interface (DVI) 56, and an optical disk drive (ODD) 57.

The main memory 51 is a memory configured to store programs or interim results of program execution, for example. The CPU 52 is a central processing unit configured to read a program from the main memory 51 to execute the program. The CPU 52 includes a chipset including a memory controller.

The LAN interface 53 is an interface for coupling the computer 50 to another computer through a LAN. The HDD 54 is a disk device configured to store programs or data, and the super IO 55 is an interface for coupling an input device such as a mouse or a keyboard. The DVI 56 is an interface for coupling to a liquid crystal display device, and the ODD 57 is a device configured to read/write data from/to a digital versatile disc (DVD).

The LAN interface 53 is coupled to the CPU 52 by peripheral component interconnect express (PCIe), and the HDD 54 and the ODD 57 are coupled to the CPU 52 by serial advanced technology attachment (SATA). The super IO 55 is coupled to the CPU 52 by low pin count (LPC).

The database management program that is executed in the computer 50 is stored in a DVD, which is an example of a recording medium from which the computer 50 may read programs. The database management program is read by the ODD 57 from the DVD to be installed on the computer 50. Alternatively, the database management program is stored in, for example, a database of another computer system coupled through the LAN interface 53. The database management program is read from the database to be installed on the computer 50. The installed database management program is stored in the HDD 54. The database management program is read by the main memory 51 to be executed by the CPU 52.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information management device comprising:
a memory; and
a processor coupled to the memory and the processor configured to
receive an access request to information related to individual, the access request including designation of a first data table including first information related to the individual and a second data table including second information related to the individual, perform, in accordance with whether the first data table and the second data table include a same key, determination of whether the individual is identified based on a combination of the first information and the second information to be included in a response to the access request, and perform a stop of output of the response when it is determined that the individual is identified based on the combination.

2. The information management device according to claim 1, wherein
the stop includes outputting another response generated by masking at least a part of the first information or the second information, or outputting an alert.

3. The information management device according to claim 2, wherein
the outputting of the alert is performed when it is determined that the access request is a request for searching the first data table or the second data table for the same key.

4. The information management device according to claim 2, wherein
the outputting of the other response is performed when it is determined that the access request complies with a normal task policy.

5. The information management device according to claim 4, wherein
the normal task policy includes at least one of a period of time in which the access request is permitted, an application permitted to issue the access request, and a client device permitted to issue the access request.

6. The information management device according to claim 1, wherein
the stop is performed when it is determined that the access request is a request for combining, by the same key, information in the first data table with information in the second data table or that the access request is a request for searching, by the same key, the first data table or the second data table for the information related to the individual.

7. The information management device according to claim 1, wherein
the processor is configured to specify a relationship between the second data table and the first data table by using a referential constraint set to the second data table.

8. The information management device according to claim 1, wherein
the processor is configured to identify, from a plurality of data tables, a data table that includes a name and a date of birth as the first data table.

9. A computer-implemented information management method comprising:
receiving an access request to information related to individual, the access request including designation of a first data table including first information related to the individual and a second data table including second information related to the individual;
determining, in accordance with whether the first data table and the second data table include a same key, whether the individual is identified based on a combination of the first information and the second information to be included in a response to the access request; and
stopping output of the response when it is determined that the individual is identified based on the combination.

10. The information management method according to claim 9, wherein
the stopping includes outputting another response generated by masking at least a part of the first information or the second information, or outputting an alert.

11. The information management method according to claim 10, wherein
the outputting of the alert is performed when it determined that the access request is a request for searching the first data table or the second data table for the same key.

12. The information management method according to claim 10, wherein
the outputting of the other response is performed when it is determined that the access request complies with a normal task policy.

13. The information management method according to claim 12, wherein
the normal task policy includes at least one of a period of time in which the access request is permitted, an application permitted to issue the access request, and a client device permitted to issue the access request.

14. The information management method according to claim 9, wherein
the stopping is performed when it is determined that the access request is a request for combining, by the same key, information in the first data table with information in the second data table or that the access request is a request for searching, by the same key, the first data table or the second data table for the information related to the individual.

15. The information management method according to claim 9, further comprising:
specifying a relationship between the second data table and the first data table by using a referential constraint set to the second data table.

16. The information management method according to claim 9, further comprising:
identifying, from a plurality of data tables, a data table that includes a name and a date of birth as the first data table.

17. A non-transitory computer-readable medium storing instructions executable by one or more computers, the instructions comprising:
one or more instructions for receiving an access request to information related to individual, the access request including designation of a first data table including first information related to the individual and a second data table including second information related to the individual;
one or more instructions for determining, in accordance with whether the first data table and the second data table include a same key, whether the individual is identified based on a combination of the first information and the second information to be included in a response to the access request; and
one or more instructions for stopping output of the response when it is determined that the individual is identified based on the combination.

* * * * *